United States Patent [19]

Gresch

[11] Patent Number: 5,090,306

[45] Date of Patent: Feb. 25, 1992

[54] UNIT FOR THE PREPARATION OF FRUITS, BERRIES AND/OR VEGETABLES FOR THE EXTRACTION OF LIQUID RAW PRODUCTS

[75] Inventor: Walter Gresch, Niederweningen, Switzerland

[73] Assignee: Bucher- Guyer AG Maschinenfabrik, Niederweningen, Switzerland

[21] Appl. No.: 353,636

[22] PCT Filed: Aug. 17, 1988

[86] PCT No.: PCT/CH88/00140

§ 371 Date: Apr. 14, 1989

§ 102(e) Date: Apr. 14, 1989

[87] PCT Pub. No.: WO89/01299

PCT Pub. Date: Feb. 23, 1989

[30] Foreign Application Priority Data

Aug. 19, 1987 [CH] Switzerland .................. 3183/87

[51] Int. Cl.⁵ .................................................. A23L 1/02
[52] U.S. Cl. .................................. 99/510; 99/484; 99/495; 99/513; 100/94; 100/102; 100/118
[58] Field of Search ............... 99/495, 509–511, 99/513, 483, 484; 426/481, 489, 495; 100/39, 102, 118, 94, 121; 241/101.2

[56] References Cited

U.S. PATENT DOCUMENTS

| | | | |
|---|---|---|---|
| 2,649,371 | 8/1953 | Reid | 241/101.2 |
| 3,301,685 | 1/1967 | Harwell | 426/489 |
| 3,346,392 | 10/1967 | Lowe et al. | 426/481 |
| 3,398,677 | 8/1968 | Theobald et al. | 100/39 |
| 3,518,093 | 6/1970 | Asti | 426/489 |
| 3,684,520 | 8/1972 | Bickoff et al. | 426/495 |
| 3,775,133 | 11/1973 | Batley, Jr. | 426/489 |
| 3,976,805 | 8/1976 | Becker | 426/489 |
| 4,301,719 | 11/1981 | Gerow | 99/510 |
| 4,313,372 | 2/1982 | Gerow et al. | 99/495 |
| 4,608,266 | 8/1986 | Epperson et al. | 426/489 |

*Primary Examiner*—Timothy F. Simone
*Attorney, Agent, or Firm*—Edmund M. Jaskiewicz

[57] ABSTRACT

For the extraction of juice pulp from fruits, berries and/or vegetables the raw material, which may consist of whole fruits, is first comminuted in a comminuting device (1) and subsequently squeezed out with the help of a press (2). Press (2) is constructed in such a way, that together with the juice separated from the raw material, a high proportion of valuable cell material is pressed off. Through this process a viscous juice pulp results, which subsequently is further processed for refining purposes, for example for the manufacture of clear juice, in a crossflow filtration device (7) which follows press (2). Through the process according to the invention the quality of the refined products as well as the economy of the unit and the yield are significantly improved, especially in connection with a recycling press (4) assigned to press (2).

22 Claims, 3 Drawing Sheets

UNIT FOR THE PREPARATION OF FRUITS, BERRIES AND/OR VEGETABLES FOR THE EXTRACTION OF LIQUID RAW PRODUCTS

BACKGROUND OF THE INVENTION

1. Field of the Invention

The invention relates to a process for the preparation of fruits, berries and/or vegetables for the extraction of liquid raw products by comminuting the raw material and separating the juice pulp.

2. Description of the Related Art

For the production of juice pulp (pulpy juice) as a preliminary step for further refining measures it is known to use so-called pulping machines. The raw material to be processed which can consist of whole fruits is first crushed and then the juice is extracted in the pulping machine. In the course of this the juice pulp consisting of juice and cell material is separated from the seeds, stems, skins and cores by mechanical means.

This known process has the disadvantage that because of the intensive mechanical handling of the raw material in the pulping machine, especially in malaceous fruit. the stems, seeds and skin fragments are damaged, thereby causing a negative impact on the taste and aroma of the juice. Furthermore the residue consisting of stems, seeds, skins and cores which have been largely crushed by the pulping machine causes considerable difficulties in further extraction of juice by pressing. The overall yield is therefore smaller and the production of pulpy juices is uneconomical.

Generally known are also the conventional processes for extracting fruit juice by pressing. The object of these known methods is to achieve the highest possible yield with the lowest possible dregs content. Because of the dregs content work is done with a small mesh size, which, for example, in belt presses is about 0.5 mm. In this instance the fine dregs and valuable cell material remain in the residue of the press and are lost. Moreover the layer thickness of the pressed raw material with conventional belt presses is relatively great (approximately 30 to 50 mm). Because of this long juice paths are caused which do not let viscous cell material pass through which is needed for the extraction of juice pulp. The same is true for the passage openings in the separation wall between the juice which has flowed off and the residue, which are too small to let juice pulp through and would become clogged. The conventional pressing processes are therefore not suitable for the extraction of juice pulp, which along with the juice that has been squeezed out also still contains a large portion of cell material. The raw juice extracted from conventional presses is further processed without any other liquefaction technology into clear or opaque juices, but not pulpy juices.

SUMMARY OF THE INVENTION

The object of this invention is to provide a process with appropriate equipment for extracting juice pulp, which along with a high degree of economy and reduced investment costs, guarantees improved quality of the juice pulp.

According to the invention this object is achieved in that juice pulp consisting of juice and cell material is extracted by means of pressing the comminuted raw material.

The advantages obtained with the invention consist particularly in the fact that by the gentle handling of the raw material during the pressing, stems, seeds and skin fragments of the fruit are not crushed and damaged. As a consequence an improvement in the quality of the juice pulp results. As a result of the large mesh size of the press according to the invention and the special design of the separation and sieve surfaces, fine dregs and cell material are carried off with the juice pulp. Therefore in the residue there remains less fine dregs and cell material which favors the economical use of a recycling press for increasing the yield. The strain on the conventional press functioning preferably as a recycling press is thus greatly relieved by the press according to the invention. As a result, the demands on the recycling press are not so high, so that it can be built more cheaply and the investment costs are reduced. Particularly well suited as recycling press are presses of the horizontal basket press type because of the long flow paths which are necessary for the recovery of retentate from the crossflow filtration. As compared to conventional processes, particularly pressing processes, the yield is increased, since along with the juice more or less whole cells with the juice they contain are also squeezed out. The construction of the press according to the invention can be configured in a very simple and cost-saving manner because of lesser demands as compared to conventional juice presses, for example larger passage openings.

BRIEF DESCRIPTION OF THE DRAWING

The invention is explained in more detail in the following description and drawing which represent various embodiments. There are shown in.

DESCRIPTION OF THE PREFERRED EMBODIMENTS

Figure 1:
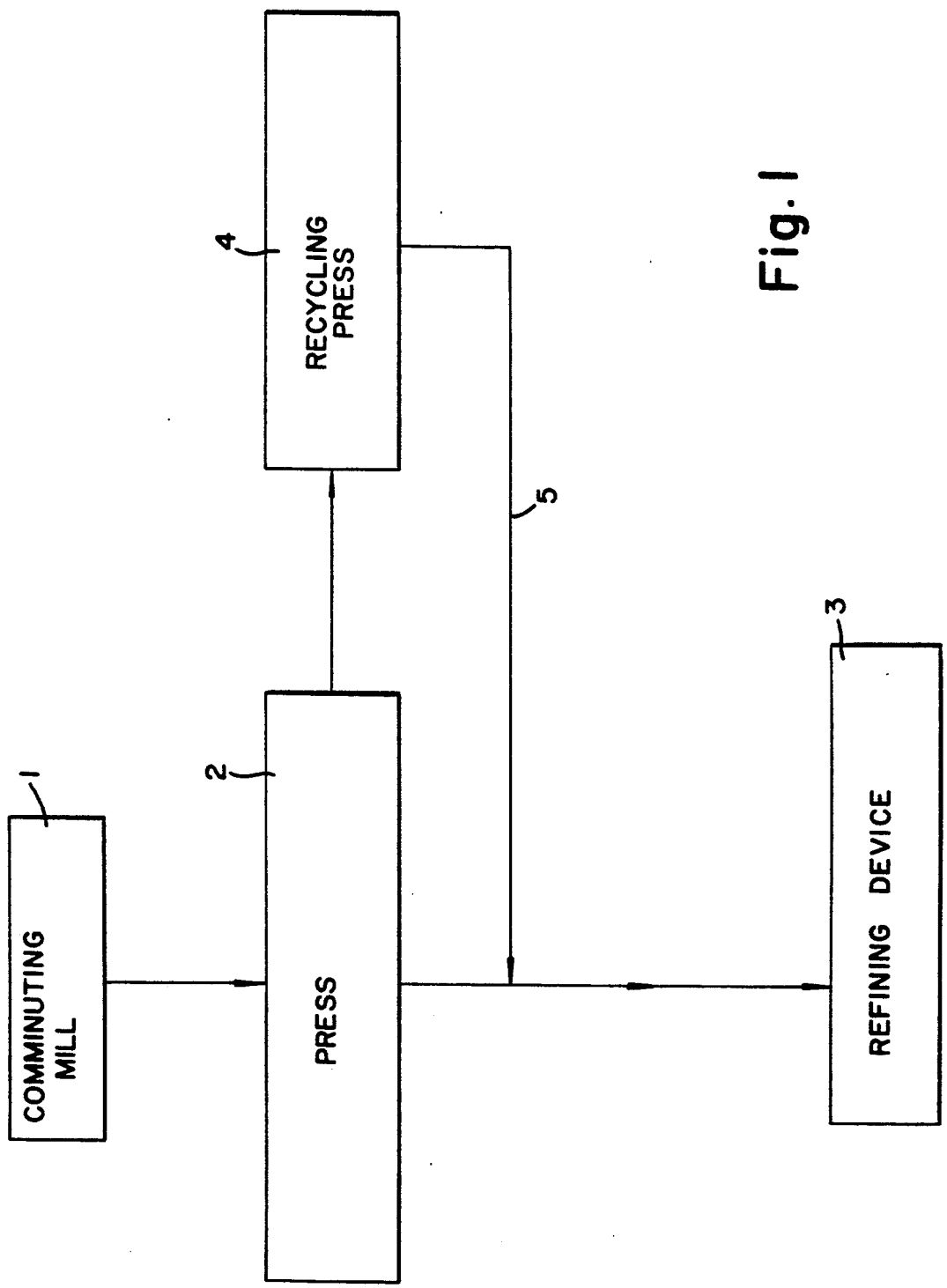
FIG. 1 a diagrammatic representation of the unit according to the invention for the extraction of juice pulp, FIG. 2 unit 1 according to FIG. 1 with a crossflow filtration device connected downstream, FIG. 3 a diagrammatic side view of a belt press for the extraction of juice pulp and FIG. 4 a cross section through the belt press along line IV—IV in FIG. 3 in an enlarged representation.

In the embodiment shown in FIG. 1 the raw material to be processed in the form of whole fruits is introduced and communited in a comminuting device 1, which, for example, can be a mill. The mash thus obtained is preferably treated with known mash enzymes, so that the individual cells will separate better from the cell system. After that the treated mash is fed to a press 2 and squeezed out. Press 2 it is a press system specially developed for the extraction of juice pulp, which guarantees an extremely gentle processing of the comminuted raw material. The specific construction characteristics of press 2 are explained later. From press 2 the extracted juice pulp, which consists of a pulpy liquid mass of juice and cell material, is conveyed to a refining device 3. In refining device 3 the juice pulp is further processed into pulpy juices, clear juice through filtration, dry products through drying, substrates to bioreactors, wine etc.

The residue remaining in press 2 is again squeezed out to improve the yield in a recycling press 4 assigned to press 2. The juice extracted is fed by a pipe 5 downstream from press 2 into the juice pulp.

Figure 2:
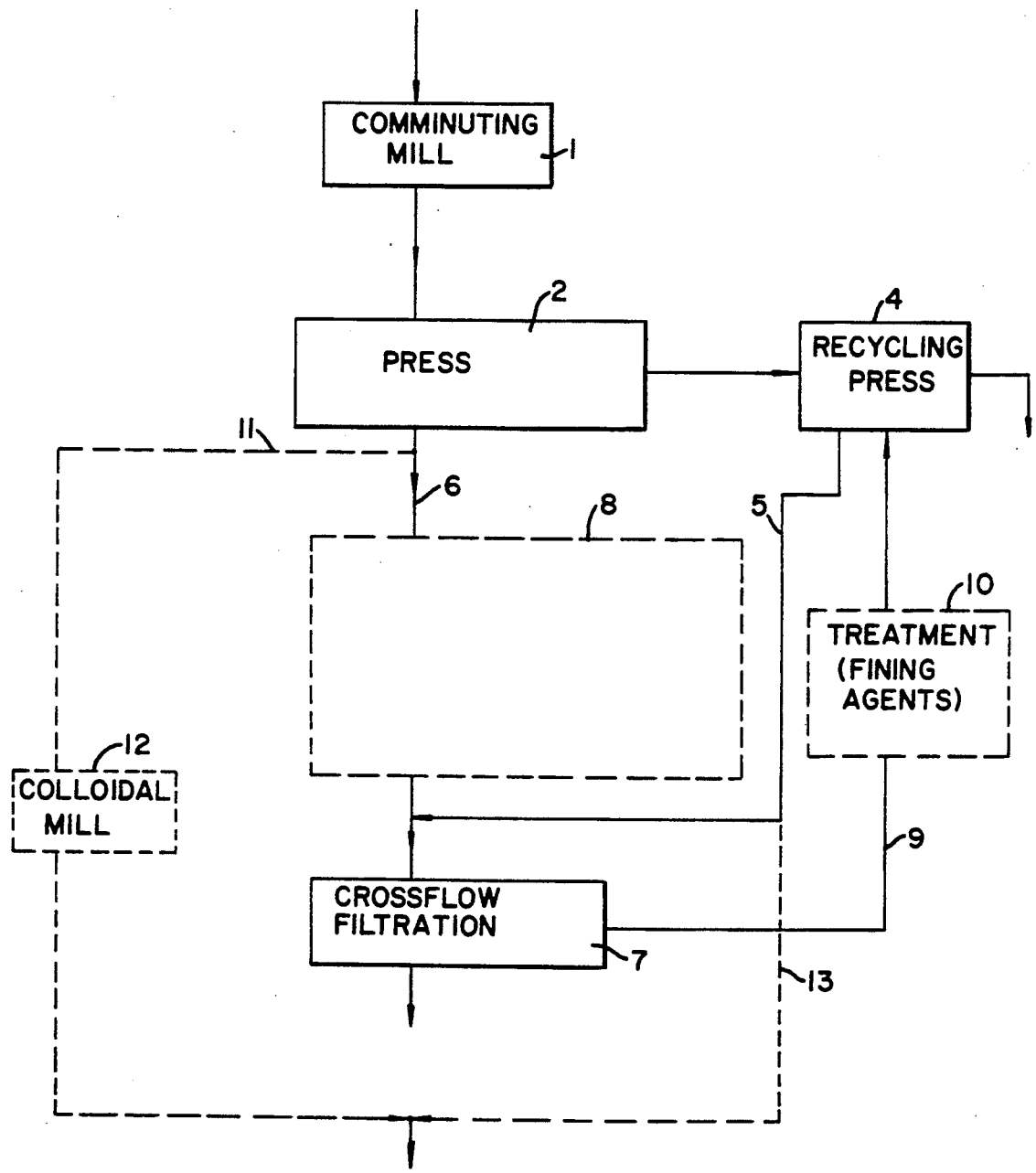

A further embodiment of the invention is represented in FIG. 2. As in the embodiment shown in FIG. 1 the raw material is comminuted in the comminuting device 1 and conveyed to the press 2. For the treatment of the mash pectolytic enzymes are added to the raw material in dosed amounts before the comminuting. The juice pulp consisting of juice and cell material which has been separated from the comminuted raw material in press 2 is conveyed over a pipe 6 of a crossflow filtration device 7, which consists of an ultrafiltration or a microfiltration device, and is processed into clear juice. In pipe 6 between press 2 and crossflow filtration device 7 a treatment stage 8 is placed, in which the juice pulp is treated with juice enzymes in a known manner. The enzyme treatment achieves a reduction in the viscosity of the juice pulp and thereby an improvement in the filtering performance in crossflow filtration device 7 which follows immediately downstream. In treatment stage 8 or a further, subsequent treatment stage the juice pulp can be further liquefied by various liquefaction techniques, for example by enzymatic, chemical or physical breaking down of the cells, before it is conveyed to crossflow filtration device 7. As in the unit shown in FIG. 1, also in the embodiment shown in FIG. 2 the residue from press 2 is introduced into recycling press 4 and squeezed out.

The juice extracted is fed by pipe 5 between treatment stage 8 and crossflow filtration device 7 into pipe 6 or into the juice pulp. After this the juice pulp is processed in crossflow filtration device 7 into clear juice.

From crossflow filtration device 7 a pipe 9 leads to the recycling press 4, to mix the retentate from the crossflow filtration with the residue from press 2 which is to be squeezed out for further use in recycling press 4. There it is suitable to place a preliminary treatment stage 10 for the retentate in pipe 9 between crossflow filtration device 7 and recycling press 4. In preliminary treatment stage 10 the retentate is treated in a known manner with cellulase and fining agents, before it is fed into recycling press 4.

FIG. 2 shows still another possibility for further processing the juice pulp extracted from press 2 into pulpy juices. As can be gathered from the representation in broken lines, from pipe 6 a further pipe 11 branches off, which conveys the juice pulp to a colloidal mill 12 for example. There the juice pulp is processed into pulpy juice in a known manner and subsequently is mixed with the juice from recycling press 4 by branching off of a pipe 13 from pipe 5.

Figure 3:
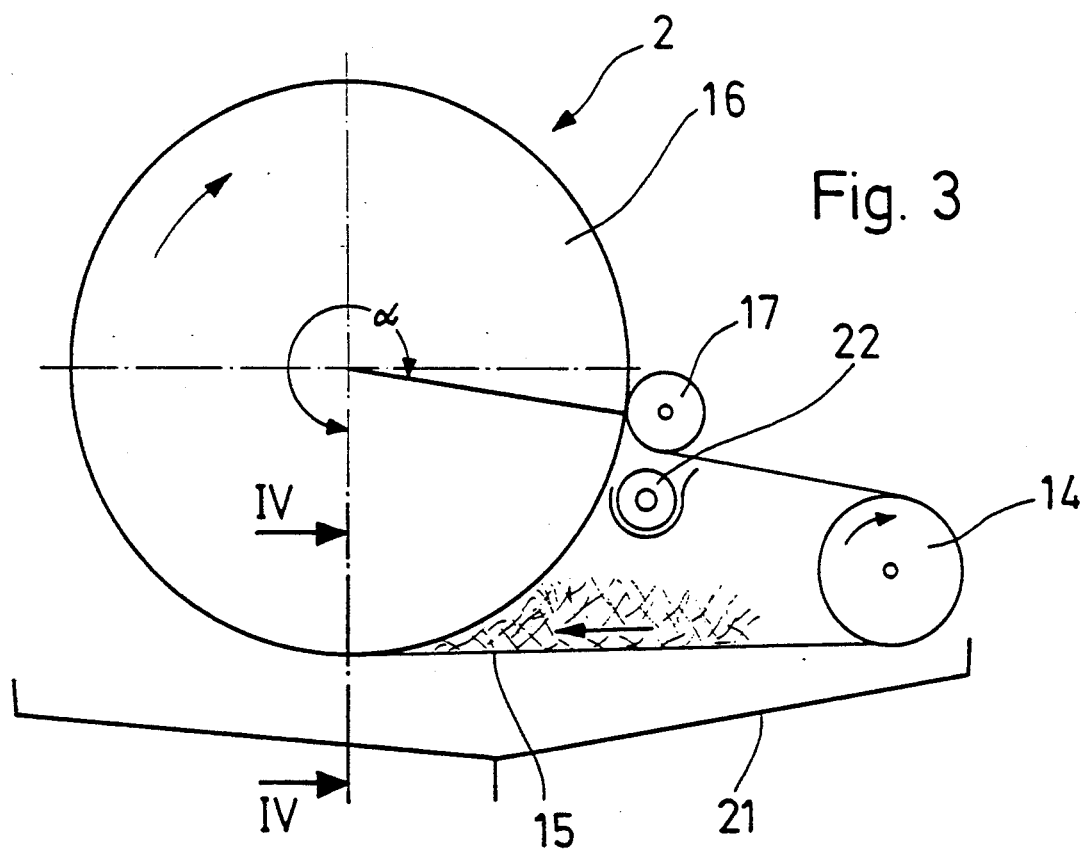
Figure 4:
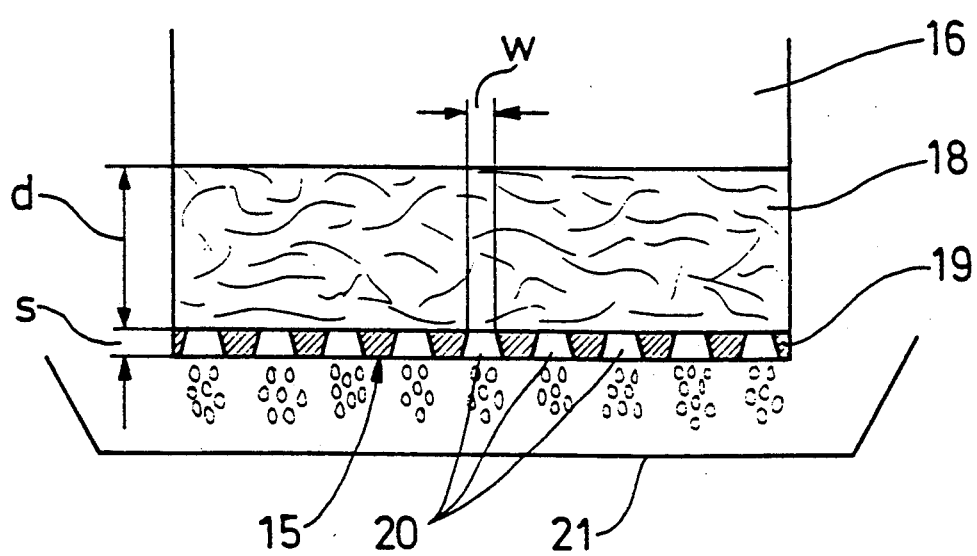

In FIG. 3 a specialized configuration of press 2 in the form of a belt press is shown. From a drive drum 14 there runs a press belt 15 about horizontally to a press drum 16 and is led around the press drum 16 at a belt wrap alpha of about 280°. By a deflecting roller 17, press belt 15 is led back to a drive drum 14. The raw material to be pressed and comminuted is conveyed on the inner side of the horizontal segment of press belt 15 into the gap between the press belt and the outer surface of press drum 16. As can be seen from FIG. 4, a press layer 18 of the raw material results thereby, whose thickness d is approximately 3-20 mm. Press layer 18 is relatively thin in comparison to conventional belt presses, in which the press layer thickness is about 30 to 50 mm, so that short juice paths result, which let pass through as high a portion as possible of viscous cell material along with the juice. In connection with the large belt wrap alpha of at least 250° a high specific effectiveness of the press is achieved as to performance and yield.

Press belt 15 is designed as a sieve belt and forms a separation wall 19, which is provided with openings 20, through which the juice pulp can flow off and be separated from the residue. The juice pulp extracted is collected in a vat 21 placed underneath the press. The press residue, which leaves press drum 16 in the area of deflecting roller 17, is picked up by a conveyor screw 22 placed underneath deflecting roller 17 and carried off. In other embodiments separation wall 19 can also be formed by the wall of press drum 16. In this case press belt 15 can be closed and openings 20 can be placed in the partition of press drum 16.

Openings 20 in separation wall 19 or in press belt 15 are made relatively large in comparison with conventional belt presses, and are widened in the direction of the press, so that an easier passage of the viscous juice pulp is made possible. Preferably the width of gap w of openings 20, especially in the processing of malaceous fruit, is about 1.5 to 3 mm, while conventional belt presses show a gap width of only about 0.5 mm. In contrast to known presses thickness S of separation wall 19 or else of press belt 15 is made relatively thin walled at 0.4 to 1 millimeter, while the thickness in conventional belt presses is about 2 mm. Through these measures according to the invention instances of clogging of openings 20 are largely prevented and the performance of the press is enhanced.

A size ratio in the choice of the thickness d of press layer 18, gap width w of openings 20 and thickness S of separation wall 19 has proven to be particularly effective and advantageous; in this ratio, press layer thickness d is less than 15 times gap width w and gap width w is more than 3 times thickness S of separation wall 19.

Since these features and characteristics produce high specific yields in comparison to known presses, which are used for conventional juice extraction, there result for juice pulp extraction according to the invention extremely simple and inexpensive presses. At the same time higher yields are possible, since along with the juice whole cells containing juice are also pressed out, which in the course of the process according to the invention is extracted later on.

As a device for the extraction of juice pulp according to the invention simple belt press constructions are particularly well suited, which in the sense of the cited features and characteristics are adapted to the process according to the invention. But with appropriate modifications even other press systems can find use, if they show the features and characteristics according to the invention. Thus, for example, the process according to the invention can even be adapted to a diaphragm press, in which the material to be pressed is pressed against a gap filter or a sieve by means of a flexible diaphragm, with relatively thin layers of material to be pressed. Such types of presses are not yet used for juice extraction in the above cited design. Through corresponding adaptation in line with the invention it is possible to work with these presses in a simple manner with thin press layers, which are necessary for carrying out the process according to the invention.

The process and the unit according to the invention can also be used to advantage for the preparation of diverse raw materials from agricultural products and wastes into substrates for biotechnological processes.

I claim:

1. Unit for the preparation of fruits, berries and/or vegetables for the extraction of liquid materials therefrom comprising a comminuting device (1) into which are supplied the fruits, berries and/or vegetables as raw materials to obtain mash, a connected press (2) to receive the mash and to extract therefrom juice pulp consisting of juice and cell material, means in said press (2) for separating the juice pulp from a residue consisting of stems, seeds, cores and skin fragments such that a thin press layer (18) results to define a short juice path therethrough whereby a high portion of cell material is passed through the press layer along with the juice, and a refining device (3) to receive said extracted juice pulp, said means for separating comprising a separation wall (19) in said press (2) for the separating of said juice pulp and a residue, said separation wall (19) having openings (20) with a gap width (w), wherein said gap width (w) is more than three times the thickness (s) of separation wall (19).

2. Unit according to claim 1, wherein said press (2) is connected to a recycling press (4) in which the residue from press (2) is squeezed out and the extracted juice is conveyed to the juice pulp through a pipe (5) between press (2) and refining device (3).

3. Unit according to claim 2, wherein said recycling press (4) comprises a horizontal basket press.

4. Unit according to claim 1 wherein said press (2) has connected thereto a cross-flow filtration device (7) to receive extracted juice pulp.

5. Unit according to claim 4, wherein said crossflow filtration device (7) comprises one of an ultrafiltration or microfiltration device.

6. Unit according to claim 4 wherein the crossflow filtration device (7) produces a retentate which is conveyed back through a pipe (9) into a recycling press (4).

7. Unit according to claim 6, wherein between crossflow filtration device (7) and recycling press (4) a preliminary treatment stage (10) is provided, in which the retentate is treated with cellulase and fining agents.

8. Unit according to claim 4 wherein between said press (2) and crossflow filtration device (7) a treatment stage (8) is provided in which the juice pulp is treated with enzymes.

9. Unit according to claim 1 wherein a device for the liquefaction of the juice pulp by enzymatic, chemical or physical breaking down of cells is connected to said press (2) to receive extracted juice pulp.

10. Unit according to claim 1 wherein to said press (2) there is connected downstream a colloid mill (12) for the extraction of pulpy juice.

11. Unit according to claim 10, wherein a recycling press (4) is connected to said press (2) to receive residue therefrom and the juice extracted from recycling press (4) is conveyed through a pipe (13) to the pulpy juice extracted from colloid mill (12).

12. Device according to claim 1 wherein thickness (d) of said press layer (18) is approximately 3 to 20 mm.

13. Device according to claim 1 wherein thickness (d) of press layer (18) is less than 15 times a gap width (w) of openings (20) which are provided in a sieve belt (15) defining a separation wall (19) for the separating of juice pulp and residue.

14. Device according to claim 13, wherein gap width (w) of openings (20) is approximately 1.5 to 3 mm.

15. Device according to claim 13 wherein separation wall (19) shows a thickness (s) of approximately 0.4 to 1 mm.

16. Device according to claim 13 wherein openings (20) in the separation wall (19) widen in the direction of the press.

17. Device according to claim 1 wherein said press (2) comprises a belt press.

18. Device according to claim 17 wherein the belt press exhibits a press drum (16), to which the raw material is conveyed on the under side about horizontally, and press belt (15) is brought back after a belt wrap of at least 250° by a deflecting roller (17) to drive roller (14).

19. Device according to claim 18, wherein underneath deflecting roller (17) a conveyor screw (22) is placed for carrying away the pressing residue.

20. Device according to claim 18 wherein separation wall (19) is formed by press belt (15) which is made as a sieve belt.

21. Device according to claim 18 wherein said separation wall (19) is defined by the wall of press drum (16).

22. Device according to claim 1 wherein said press (2) comprises a diaphragm press.

* * * * *